United States Patent [19]

Eddens

[11] Patent Number: 4,548,657
[45] Date of Patent: Oct. 22, 1985

[54] BOW CONTROL FOR METALLIC STRUCTURES

[75] Inventor: Fletcher C. Eddens, Wilmington, N.C.

[73] Assignee: General Electric Company, San Jose, Calif.

[21] Appl. No.: 387,829

[22] Filed: Jun. 14, 1982

[51] Int. Cl.⁴ .............................................. C22F 1/18
[52] U.S. Cl. ................................... 148/133; 148/154; 148/421; 376/424
[58] Field of Search ................. 148/133, 154, 39, 421; 428/610; 219/10.43; 376/906, 424, 457

[56] References Cited

U.S. PATENT DOCUMENTS

| | | | |
|---|---|---|---|
| 3,431,170 | 3/1969 | Lass et al. | 376/440 |
| 3,847,684 | 11/1974 | Amick | 148/20.6 |
| 4,000,013 | 12/1976 | MacEwen et al. | 148/11.5 F |
| 4,108,687 | 8/1978 | Armand et al. | 148/2 |
| 4,238,251 | 12/1980 | Williams et al. | 148/133 |
| 4,279,667 | 7/1981 | Anthony et al. | 148/421 |
| 4,290,828 | 9/1981 | Aisaka et al. | 148/11.5 Q |
| 4,401,486 | 8/1983 | Pusateri et al. | 148/154 |

*Primary Examiner*—Peter K. Skiff
*Attorney, Agent, or Firm*—Ivor J. James, Jr.; Samuel E. Turner; Raymond G. Simkins

[57] ABSTRACT

A method of controlling the bowing action of fuel channels used in nuclear reactor cores is disclosed. Each channel is heat treated and mounted in its control rod module with an orientation dependent on its prior heat treatment. Upon exposure to radiation, the channels will bow in a desired direction away from the control rod.

9 Claims, 6 Drawing Figures

BOW CONTROL FOR METALLIC STRUCTURES

The present invention relates generally to bow control of metallic structures and more particularly to a new and improved method of controlling the bowing action of an elongate metallic structure, which occurs when the structure attempts to expand non-uniformly under the influence of external factors such as nuclear radiation.

BACKGROUND OF THE INVENTION

A nuclear reactor core contains in pertinent part a plurality of fuel bundles, each bundle comprising, for example, an 8×8 array of elongate fuel rods disposed in an elongate metallic structure, such as a fuel channel. These structures are disclosed in ample detail in U.S. Pat. No. 3,431,170 (Lass et al.; issued Mar. 4, 1969; assignee: General Electric Company), which is hereby expressly referred to and incorporated herein.

In a common configuration of a reactor core, each channel has a generally square cross section defined by opposite pairs of parallel walls which contain the fuel rods therebetween. The channels may be organized into modules, each module including four channels as well as an elongate control rod having a cruciform cross section which separates the channels within the module.

It is known by those skilled in the art that fuel channels for use in a nuclear reactor core must be fabricated from materials having certain required properties. These include low absorption of neutrons emanating from the UO$_2$ fuel, high corrosion resistance, and high mechanical strength to withstand stresses in the reactor core. Zirconium and alloys thereof, e.g., the commercially available Zircaloy-2 and Zircaloy-4 alloys, are known to provide these properties and are widely used in the fabrication of fuel channels for nuclear reactor cores. Zircaloy-2 contains about 1.5 percent tin, 0.15 percent iron, 0.1 percent chromium, 0.5 percent nickel and 0.1 percent oxygen. Zircaloy-4 contains substantially no nickel and about 0.2 percent iron, but is otherwise similar to Zircaloy-2.

In the fabrication of fuel channels, the flat material is shaped into a box form and sometimes uniformly heated to temperatures above 1500° F. to provide increased resistance to corrosion. Experience has shown that exposure to radiation within the reactor core causes the fuel channels to grow in length as a result of the effect of the radiation on the microstructure of the Zircaloy. This can cause unwanted bowing when the growth is non-uniform.

Typically, each channel may have a length on the order of thirteen feet and it is secured on at least one end of the fuel bundle which it surrounds. If the bowing action occurs in the direction of the control rod and the bowed channel makes actual contact with the control rod, a malfunction of the reactor may result. Thus, all such bowing is carefully monitored in existing nuclear installations and drastic and costly shutdown procedures are initiated to prevent the fuel channel or the control rods from interferring with reactor operation.

OBJECTS OF THE INVENTION

It is a primary object of the present invention to provide a new and improved method of controlling the bowing action of metallic structures in order to prevent malfunctions when the latter expand under the influence of nuclear radiation.

A further object of the present invention is to provide a new and improved method of preventing damage to the fuel channels of a nuclear reactor by controlling their direction of bow upon their exposure to radiation.

An additional object of the present invention is to provide a new and improved method of controlling the bowing action of the fuel channels in a nuclear reactor by heat treating the channels prior to mounting to provide them with a predicted direction of bowing.

It is still another object of the present invention to control the direction of bow of heat treated fuel channels in the control rod modules of a nuclear reactor core by orienting the channels upon mounting such that bowing occurs only in an unobstructed direction.

It is still a further object of the present invention to provide a new and improved method of bow control of fuel channels for use in a nuclear reactor core by heating a pair of adjacent walls of each channel in the core to a temperature different from the temperature applied to the remainder of the channel.

It is still an additional object of the present invention to prolong the useful life of fuel channels upon exposure to radiation in a nuclear reactor, by specialized heat treatment of each channel and by the selective orientation of each channel upon subsequent mounting.

SUMMARY OF THE INVENTION

In accordance with the principles of the present invention, the structure to which the inventive method is applied in one specific example consists of an elongate, hollow fuel channel. The channel is heated in a manner whereby a pair of adjacent channel walls is raised to a predetermined temperature which is higher than the temperature to which the opposite pair of adjacent walls is heated. The unequal heating produces differences in the microstructure of the respective pairs of walls and determines the direction of bowing when the channel is subsequently mounted and caused preferentially to grow upon exposure to nuclear radiation. Upon mounting in a control rod module, the heat-treated fuel channel is oriented in a manner whereby bowing is allowed to occur without obstruction.

The foregoing and other objects of the present invention together with the features and advantages thereof will become apparent from the following detailed specification when read in conjunction with the accompanying drawing.

DETAILED DESCRIPTION OF THE INVENTION

Figure 3:
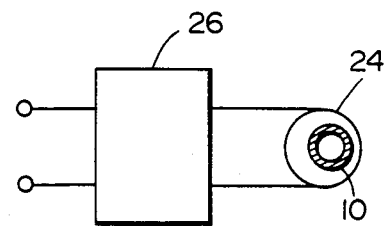
FIG. 3 is a top view of a portion of another embodiment of a fuel channel or other structure and heating apparatus for carrying out the invention.
Figure 2:
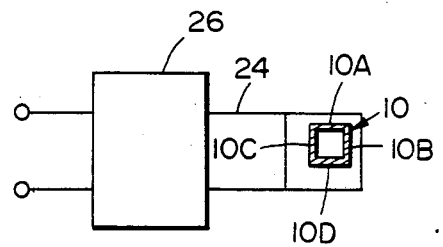
FIG. 2 is a top view of a portion of the apparatus shown in FIG. 1.
Figure 4:
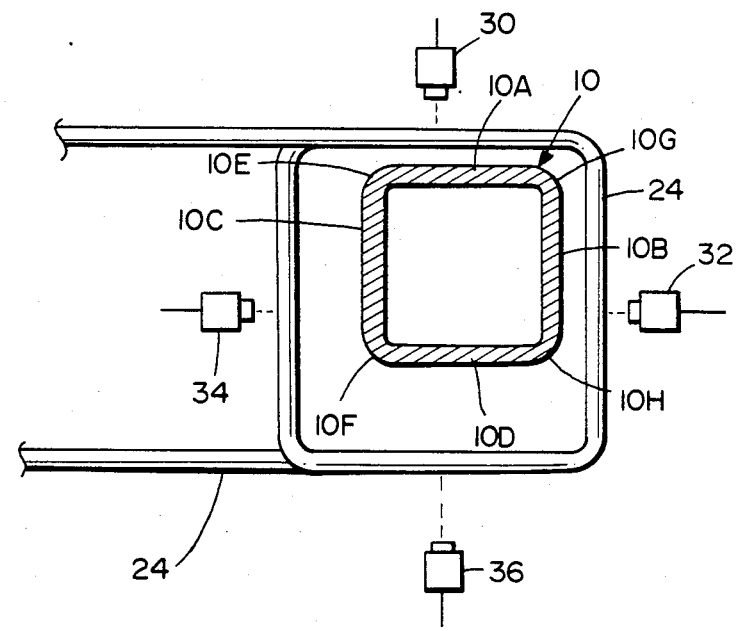
FIG. 4 is a more detailed view of a portion of the apparatus shown in FIG. 2.
Figure 5:
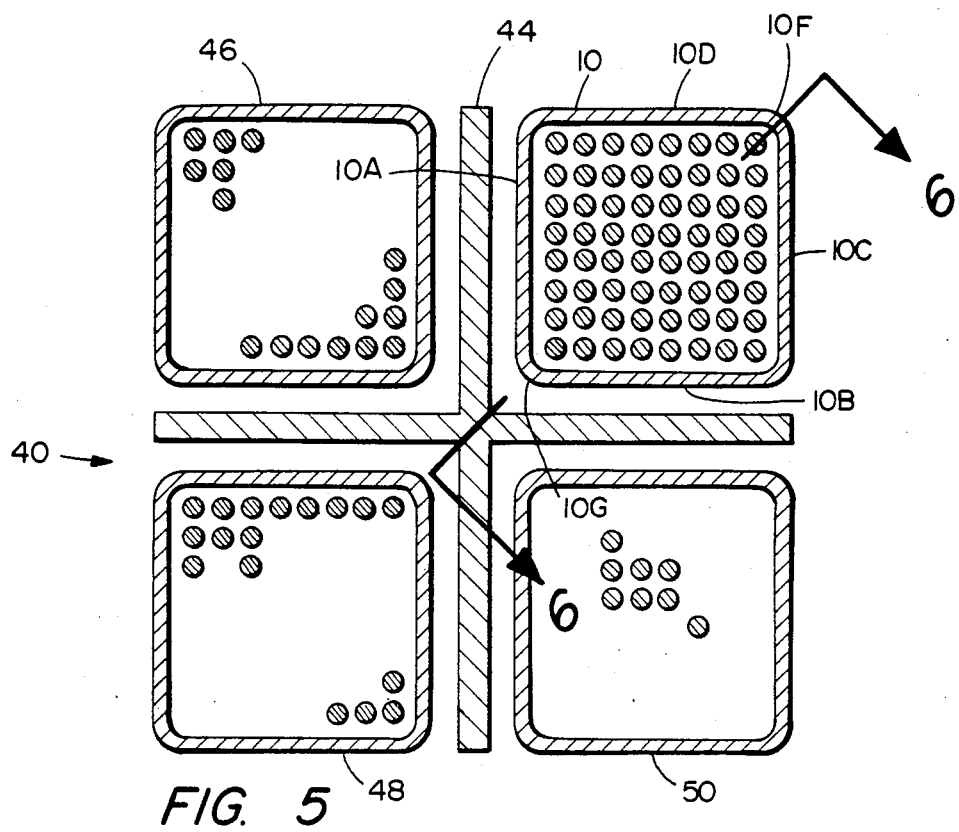
FIG. 5 is a cross-sectional view of a control rod module or cell.

With reference now to the drawing, a fuel channel 10, in the form of a hollow, elongated, metallic structure is shown and is seen to have a generally square cross section, as best illustrated in FIGS. 2, 4 and 5. It will be understood, however, that the invention is likewise applicable to fuel channels or other metallic structures with different cross-sectional configurations, e.g., a channel having a circular cross section, as shown in FIG. 3, or still other cross sections.

Figure 1:
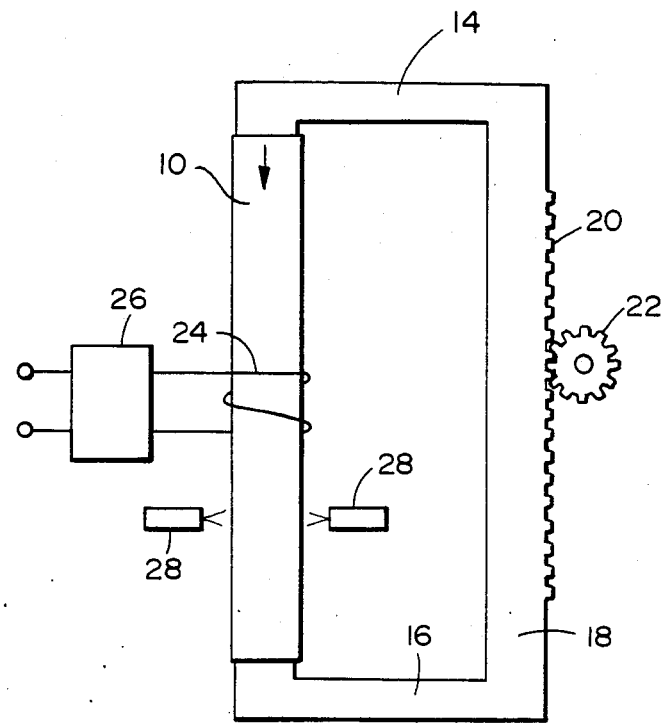
FIG. 1 is a front elevational view of a preferred heating apparatus and associated equipment for heat-treating a fuel channel in accordance with the present invention.

FIG. 1 illustrates one embodiment of an apparatus for supporting and axially passing a fuel channel 10 through a heater. As shown, channel 10 is held at its opposite ends by a pair of support arms 14 and 16 which extend outwardly from a frame 18. The frame is seen to have gear teeth 20 which are engaged by the teeth of a rotatable pinion gear 22 to form a rack and pinion arrangement. By rotating gear 22, frame 18, and hence channel 10, can be raised or lowered.

FIG. 1 further shows an electrical induction coil 24 whose current is controlled by a control circuit 26. As best shown in FIG. 2, coil 24 surrounds channel 10 and has an inside dimension greater than the maximum cross-sectional dimension of the channel. When energized by control circuit 26, the field produced by induction coil 24 causes channel 10 to be heated to a temperature determined by the control circuit. Desired cooling may be obtained by the spray action of a pair of nozzles 28, which are connected to a source of water (not shown).

As shown in FIG. 4, hollow channel 10 has a generally square cross section defined by walls 10A–10D. In accordance with the principles of the present invention, the channel is positioned within coil 24 with the center of the channel offset relative to the center of the coil. Thus, one pair of adjacent walls 10A and 10B is closer to induction coil 24 than the opposite pair of adjacent walls 10C and 10D. This is illustrated in FIGS. 2 and 4. The temperature of each wall of channel 10 is a function of the amount of heating produced by induction coil 24. The closer the channel wall is positioned to the coil, the more closely it will be linked to the field of the coil and the higher will be the temperature to which it is raised in relation to the opposite sides.

As explained above, fuel channels for nuclear reactors conventionally consist of zirconium and alloys thereof. It is known that zirconium and its alloys exhibit a phase transformation upon heating. Specifically, from a close-packed hexagonal crystal structure existing at temperatures in the alpha phase, these materials change to a body-centered cubic-form crystal structure when raised to higher temperatures, e.g., temperatures in the beta phase. In pure zirconium the boundary between the alpha and beta phase is about 1500° F., while in the alloys thereof, e.g., in Zircaloy, there is a two-phase alpha-plus-beta range at about the same temperature and transformation to all-beta occurs at about 1850° F.

Upon being heated and cooled from these elevated temperatures, Zircaloy undergoes a permanent change in crystallographic orientation or texture. The major change in texture occurs in material which has been heated above about 1800° F. Therefore, if one portion of the Zircaloy structure has been cooled from 1900° F. while another portion has been cooled from 1600° F., the two portions will have different textures. It is the texture of the metal which determines the amount of irradiation growth it will experience in a nuclear reactor core.

By selectively rotating pinion gear 22, channel 10 is passed through energized induction coil 24 and the full length of the channel walls is heated. As shown in FIG. 4, adjacent channel walls 10A and 10B are identically spaced from coil 24. Accordingly, these walls will be heated to the same temperature, e.g., to 1900° F., a temperature in the beta range, and the microstructure of these walls will be identically affected. Simultaneously, the opposite pair of channel walls, i.e., 10C and 10D, will be identically heated to 1600° F., an alpha-plus-beta temperature, and the microstructure of these walls will likewise be substantially identical.

Upon the completion of the heat treatment operation described above, the characteristics of walls 10A/10B will differ from those of the opposite pair of walls 10C/10D. Accordingly, when channel 10 is positioned in the reactor and exposed to radiation, the expansion of the wall pair which was heated to a higher temperature will be less than that of the opposite pair of walls. Thus, bowing will occur in a predicted direction for each channel.

As illustrated in FIG. 4, temperature detectors, e.g., control pyrometers 30, 36 are positioned adjacent walls 10A, 10D respectively, for sensing the temperature of these walls while the channel is being passed through coil 24. These pyrometers afford a measure of control insofar as the current applied to the coil may be raised in response to the pyrometer readings until the desired temperature is achieved. Further, the desired position of the channel within the coil may be determined with reference to the pyrometer readings. For example, channel walls 10A and 10B are moved toward the coil until the temperature read by pyrometers 30 and 32 indicates that the walls have reached a temperature in the beta range. If walls 10C and 10D are not yet in the alpha-plus-beta range in that particular position of the channel, as indicated by pyrometers 34 and 36, the overall power to the induction coil can be increased by increasing the set point of the pyrometers 34, 36. More particularly, the set point of the particular pyrometer is the desired operating value of the pyrometer in terms of power level.

The positioning process is carried out only once as a set-up procedure while the channel 10 remains stationary in the axial direction and hence only a small axial section of the channel is heated during this operation. The rounded channel corner 10G will, of course, reach the same temperature as walls 10A and 10B. Similarly, corner 10F will assume the temperature of walls 10C and 10D. Approximately at the location of corner 10H, the temperature difference between walls 10B and 10D is equalized. Likewise, corner 10E will be approximately at the average temperature of walls 10A and 10C.

Once the proper temperature and temperature differentials between the channel walls have been obtained, by the positioning procedure discussed above and by selectively varying the current applied to coil 24, the channel is passed through coil 24 in an axial direction by selectively rotating gear 22, as discussed above. The spacing of the channel walls from coil 24 remains constant while the channel passes through the coil and hence the heating along the full length of each wall remains the same.

It will be clear that the foregoing explanation regarding the positioning and heat treatment of the channel within the induction coil is likewise applicable to structures having different configurations, e.g., to the arrangement shown in FIG. 3 where a circular heating coil is used with a channel having a circular cross section. In all such embodiments, the heat treatment consists of heating a full-length portion of the elongate structure to a desired temperature which is different from the temperature to which the remainder of the structure is heated.

In the preferred embodiment of the invention discussed above in which the channel consists of Zircaloy, the approximate optimum temperature in the beta range to which two of the walls of the channel are heated, has been established at 1850° F.

Subsequent to the heat treatment of channel 10, the channel may be cooled by spraying water at room temperature from spray nozzles 28. Although only two nozzles are shown in FIG. 1, preferably a larger number of nozzles are used. Such an arrangement produces uniform cooling along the entire channel length. Alternatively, channel 10 may be quenched in warm water subsequent to the heat treatment, where the water has a temperature range between 60° C. and 88° C. The warm water quench is instrumental in preventing dimensional distortion as the channel cools down following the heat treatment.

As explained above, each channel may contain an 8×8 array of fuel rods. A relatively large number of fuel channels is used in a typical nuclear reactor core. In one arrangement, the channels are organized into cells or modules of four channels each, referred to herein as control rod modules. One such module, designed by the reference numeral 40, is illustrated in cross section in FIG. 5 and is seen to include channels 10, 46, 48, and 50. For the sake of simplicity, the fuel rods are schematically indicated only for channel 10. The four channels are separated from each other by a control rod 44 which has a generally cruciform cross section and which extends the full length of the module. Control rod 44 is adapted to slide within module 40 and may be raised or lowered independently of the channels. Prior to mounting, the channels are oriented in a manner which is determined by the previous heat treatment. In the case of channel 10, walls 10A and 10B, which were previously heated to the beta range, are seen to face inward, i.e., toward control rod 44, in the mounted channel. Because these walls were heated to higher temperature than the remainder of the channel, bowing of the channel upon greater expansion of sides 10C and 10D under the influence of nuclear radiation will occur in a direction away from the control rod. For the example under consideration, concave bowing will occur at corner 10G and convex bowing will occur along corner 10F. This action, as shown in exaggerated form in FIG. 6, assures that the channel will remain out of contact with control rod 44 and hence damage to either part from the other is precluded.

Figure 6:
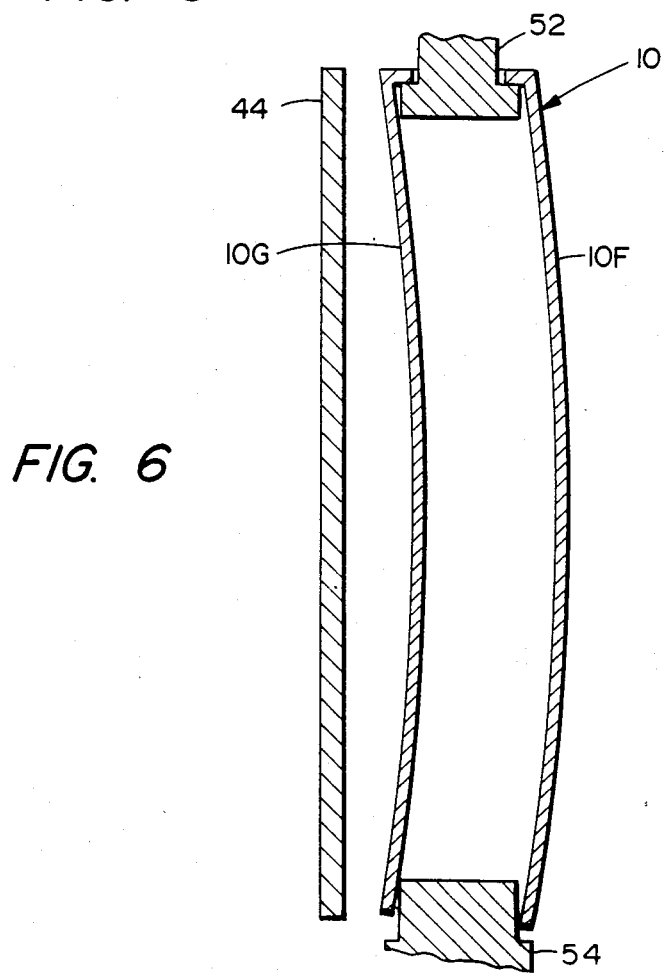
FIG. 6 is a sectional view taken along line 6—6 in FIG. 5 to illustrate the bowing action of a fuel channel upon irradiation.

FIG. 6 further shows in schematic form the mounting of channel 10. It will be seen that the channel is secured from above at a fixed mounting location 52. The bottom end of channel 10 is laterally supported by a structure 54 as for example shown in FIG. 6. Lass et al. ('170) shows in even greater detail the kind of support that can be provided, particularly in FIG. 3 thereof. Any expansion of the channel 10 must result in the bowing action shown in the drawing. By applying the heat treatment described to the channel 10 and properly orienting the channel 10 upon mounting, damage due to bowing is avoided when the channel 10 is irradiated. Damage could, for example, occur by the channel bowing into the control rod path.

While a preferred embodiment of the invention has been described and illustrated, it will be clear that various modifications and changes are possible. The use of different alloys for the channel material has already been described. Likewise, the applicability of the invention to metallic structures having different types of configurations has been mentioned, it being only required to heat a full-length portion of such structure to a perdetermined temperature range which is different from the temperature range to which the remainder of the structure is heated. An induction heat coil is conveniently used to heat the elongate structure and either the structure or the coil may be axially moved relative to the other until the full length of the structure has been heat treated. It will be clear that other means for heating the structure may be substituted and that full length heaters may be employed in which neither the structure nor the heater are required to move. From the foregoing disclosure of a preferred embodiment of the invention, it will be apparent that the invention lends itself to numerous modifications, changes, substitutions and equivalents, all of which will be obvious to those skilled in the art. Further, portions of the method disclosed may be used without other portions, or may be interchanged without departing from the spirit and scope of the invention herein. Accordingly, it is intended that the scope of the invention be limited only by the spirit and scope of the appended claims.

What is claimed is:

1. A method of controlling the bowing action of at least one elongate zirconium structure including opposite ends, adapted for vertical positioning, said bowing action occurring upon the expansion due to external factors upon said mounted structure;

said method comprising the steps of:

heat treating said structure prior to mounting, said heat treatment including heating a full length portion of said structure to a temperature in the beta range and the remainder of said structure at a temperature below the beta range, said heat-treated full-length structure portion being adapted to expand at a different rate than the remainder of said structure such that bowing due to said external factors occurs substantially only in a predicted direction; and securing said heat-treated structure at its opposite ends in a manner whereby bowing in said predicted direction is capable of taking place without interference with other nearby structures.

2. A method in accordance with claim 1 wherein said metallic structure comprises an axially elongate, hollow, cylindrical channel.

3. A method in accordance with claim 1 wherein said metallic structure is an alloy of zirconium and comprises an axially elongate, polygonally cross-sectioned, hollow channel, said channel including a full-length wall parallel to the channel axis for each side of its polygonal cross section;

said heat treatment comprising the steps of:

heating at least a pair of adjacent full-length walls of said channel to a temperature in the beta range; and heating the remaining walls to the alpha-plus-beta range.

4. A method in accordance with claim 3 wherein said channel has a generally square cross section;

said heat treatment comprising the steps of:
heating one pair of adjacent full-length walls of said channel to the beta range; and
heating the opposite pair of adjacent channel walls to the alpha-plus-beta range.

5. A method in accordance with claim 4 wherein said channel forms part of a module of four substantially identical channels adapted to operate in a nuclear reactor core, each of said channels being subjected to nuclear radiation when positioned in said core, respective channels in said module being separated from each other by a full-length control rod of substantially cruciform cross section; and
said securing step including the step of orienting each of said channels in said module in a manner whereby bowing in said predicted direction due to nuclear radiation can occur free of interference with said control rod.

6. A method in accordance with claims 2 or 3 wherein said heat treatment of said channel comprises the steps of:
positioning said channel within an induction heating coil with the cross-sectional centers of said channel and said coil displaced from each other; and
providing relative movement in an axial direction between said positioned channel and said coil.

7. A method in accordance with claim 5 wherein the heat treatment of each of said channels comprises the steps of:
positioning said channel within an induction heating coil with the cross-sectional centers of said channel and said coil displaced from each other; and
providing relative movement in an axial direction between said positioned channel and said coil.

8. A method in accordance with claim 5 wherein said mounting step includes the step of orienting each of said channels in said module in a manner whereby the walls that were heated to the higher temperature range are positioned closer to said control rod than the opposite pair of walls.

9. A method of controlling the bowing action of a plurality of hollow, axially elongate channels of an alloy of zirconium each adapted to be rigidly mounted at their opposite ends as part of a four-channel module, each of said channels having four walls and a generally square cross section, a full-length control rod having a substantially cruciform cross section separating respective channels from each other in said module and positioned in spaced relationship to said channels;
said method comprising the steps of:
positioning each of said channels within an induction heating coil with the centers of said channel and said coil displaced from each other such that one pair of adjacent channel walls is more closely coupled to said coil than the opposite pair of adjacent walls;
passing said positioned channel through said coil in an axial direction;
heating said one pair of adjacent walls to the beta range while simultaneously heating said opposite pair of adjacent walls to the alpha-plus-beta range; and
mounting each of said channels in its module with said one pair of walls positioned closer to said control rod than said opposite wall pair.

* * * * *